United States Patent
Ryu et al.

(10) Patent No.: US 7,697,648 B2
(45) Date of Patent: Apr. 13, 2010

(54) ASYMMETRIC ERROR CORRECTION DEVICE AND METHOD THEREOF, AND OPTICAL DISC REPRODUCING DEVICE THEREWITH

(75) Inventors: Eun-jin Ryu, Suwon-si (KR); Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1094 days.

(21) Appl. No.: 11/353,959

(22) Filed: Feb. 15, 2006

(65) Prior Publication Data

US 2006/0182002 A1 Aug. 17, 2006

(30) Foreign Application Priority Data

Feb. 15, 2005 (KR) ...................... 10-2005-0012261

(51) Int. Cl.
 *H04L 7/00* (2006.01)
(52) U.S. Cl. ...................................... 375/355
(58) Field of Classification Search .................. 375/355
 See application file for complete search history.

(56) References Cited

U.S. PATENT DOCUMENTS

2003/0066023 A1* 4/2003 Lee et al. ..................... 714/799
2004/0151097 A1* 8/2004 Miyashita et al. ........ 369/53.16

FOREIGN PATENT DOCUMENTS

KR 2001-0035777 A 5/2001

* cited by examiner

*Primary Examiner*—David C Payne
*Assistant Examiner*—Tanmay K Shah
(74) *Attorney, Agent, or Firm*—Sughrue Mion, PLLC

(57) ABSTRACT

An asymmetric error correction device includes an analog-to-digital (A/D) converter sampling analog radio frequency (RF) signals reproduced from an optical disc with a sampling period, converting the same into the digital sampling signals, and outputting the same; a signal detector for detecting 4T sampling signals varying in polarity thereof every four times the sampling period among the digital sampling signals; an operator selecting and adding a signal among the 4T sampling signals to operate an asymmetric error value; a counter cumulatively counting the asymmetric error value operated in the operator; and a corrector correcting a signal level of the digital sampling signal outputted from the A/D converter if the counted value counted by the counter is out of a predetermined critical range. The asymmetric error is precisely corrected even in a signal part in which the asymmetric error is minutely generated.

12 Claims, 7 Drawing Sheets

ASYMMETRIC ERROR CORRECTION DEVICE AND METHOD THEREOF, AND OPTICAL DISC REPRODUCING DEVICE THEREWITH

CROSS-REFERENCE TO RELATED APPLICATIONS

This application claims priority from Korean Patent Application No. 10-2005-0012261, filed Feb. 15, 2005 in the Korean Intellectual Property Office, the entire disclosure of which is incorporated herein by reference.

BACKGROUND OF THE INVENTION

1. Field of the Invention

Apparatuses and methods consistent with the present invention relate to an asymmetric error correction device and method thereof, and an optical disc reproducing device using the same. More particularly, the present invention relates to an asymmetric error correction device and method thereof, in which an asymmetric error value is calculated using a 4T sampling signal among digital sampling signals, the calculated asymmetric error value is cumulatively counted to check whether of an asymmetric error, with the result that a signal level is adjusted, and an optical disc reproducing device using the same.

2. Description of the Related Art

With the opening of the multimedia information age, there is a demand for storage and transfer of high-capacity digital data. Accordingly, an optical disc such as a digital versatile disc (DVD) is recently being studied actively. The DVD market has grown due to the computer business trying to employing DVD-ROM (read only memory), and the home electronics industry proposing DVD-Video. Further, optical discs are being expanded in their application fields through the releases of new DVDR (DVD-Writable), DVD-RW (rewritable), and DVD-RAM (random access memory) in the market.

Upon reproducing data recorded on such optical discs as noted above, there occurs a case where waveforms of the analog radio frequency (RF) signals being reproduced become asymmetric. When such asymmetry is present, interference is generated between the reproducing data symbols (inter-symbol interference). If the interference is generated, the detection and correction for a frequency error and a phase error are difficult, causing a problem in that a reproducing signal is distorted. In the conventional optical recording/reproducing system, in order to correct such asymmetric error, a digital sum value (DSV) algorithm was used.

A DSV algorithm is an algorithm that measures DSV to check for an asymmetric error. DSV is a value indicating how much a direct current component is included in a digital signal. Specifically, an optical recording/reproducing system converts an analog RF signal reproduced from an optical disc into a digital sampling signal. Then, a mean value of two digital sampling signals continuously detected is calculated. If the calculated mean value is greater than "0", the polar value is determined to be "1", and if the mean value is less than "0", the polar value is determined to be "−1". Then, the determined polar value is cumulatively counted, and if the cumulative polar value exceeds a predetermined threshold value, it is determined that an asymmetric error occurs and an input signal is corrected.

However, such a conventional asymmetric error correction method calculates a mean value every digital sampling signal, so that it had a drawback of a slow correction rate. Also, since only a polarity is checked and accumulated using the mean value of the respective sampling signals, there was a problem of reduction in resolution. As a result, for a 4T sampling signal reproduced in a part of variable frequency oscillator (VFO) among the sectors on the optical disc, there was a problem in that a correct asymmetric error cannot be detected.

SUMMARY OF THE INVENTION

Accordingly, it is an aspect of the present invention to provide an asymmetric error correction device and method capable of precisely compensating a minute asymmetric error through the correction of the asymmetric error using an asymmetric error value calculated from a 4T, for example, sampling signal, and an optical disc reproducing device and method using the same.

An exemplary embodiment of an asymmetric error correction device comprises: an analog/digital (A/D) converter sampling analog RF signals reproduced from an optical disc with a sampling period of T to output digital sampling signals; a signal detector for detecting 4T sampling signals among the digital sampling signals outputted from the A/D converter; an operator adding a signal among the 4T sampling signals to operate an asymmetric error value; a counter cumulatively counting or accumulating the asymmetric error value operated in the operator; and a corrector correcting a signal level of the digital sampling signal outputted from the A/D converter if the counted value counted by the counter is out of a predetermined critical range.

The asymmetric error correction device may further comprise an error magnitude modifier multiplying the asymmetric error value operated in the operator by a correcting coefficient to modify a magnitude of the asymmetric error value. In this case, the counter cumulatively counts or accumulates the asymmetric error value modified by the error magnitude modifier.

The corrector may adjust a magnitude of signal level of the digital sampling signal outputted from the A/D converter by the asymmetric error value accumulated by the counter if the asymmetric error value accumulated by the counter is out of the critical range.

The operator may add first, fourth, fifth and eighth signals among the 4T sampling signals to operate the asymmetric error value.

The signal detector may include a signal polarity determining part for determining a polarity of the digital sampling signal outputted from the A/D converter, and a sampling signal output part outputting a digital sampling signal varying in polarity thereof every four times the sampling period, as a 4T sampling signal.

The signal detector may include a variable frequency oscillator (VFO) detecting part outputting a VFO detecting signal if a VFO signal is reproduced from the optical disc, and a VFO sampling signal output part outputting the digital sampling signal outputted from the A/D converter as the 4T sampling signal during inputting the VFO detecting signal.

In this case, the VFO detecting part may include a first header signal detecting part detecting a header_peak signal reproduced from the optical disc, a second header signal detecting part detecting a header_bottom signal reproduced from the optical disc, a pulse output part outputting a control pulse in certain magnitude during detecting at least one of the header_peak signal and the header_bottom signal from the first and second header signal detecting parts, a timer part counting an elapsed time from a point when the control pulse is outputted, and a VFO detecting signal output part outputting a VFO detecting signal for a certain time if the time counted in the timer part exceeds a predetermined setting time.

In accordance with another aspect of the present invention, there is provided an asymmetric error correction method comprising: (a) sampling analog RF signals reproduced from an optical disc with a predetermined sampling period, converting the same into digital sampling signals, and outputting the same; (b) detecting 4T sampling signals varying in polarity thereof every four times the sampling period among the digital sampling signals; (c) adding a signal among the 4T sampling signals to operate an asymmetric error value; (d) cumulatively counting the asymmetric error value; and (e) correcting a signal level of the digital sampling signal if the counted value is out of a predetermined critical range.

The asymmetric error correction method may further comprise multiplying the operated asymmetric error value by a predetermined correcting coefficient to modify a magnitude of the asymmetric error value. In this case, in the operation (d), the asymmetric error value the magnitude of which is modified by multiplying the correcting coefficient may be cumulatively counted.

In the operation (e), if the cumulatively counted asymmetric error value is out of the critical range, the magnitude of the signal level of the digital sampling signal may be adjusted to the accumulated asymmetric error value.

The operator may add first, fourth, fifth and eighth signals among the 4T sampling signals to operate the asymmetric error value.

The operation (b) may comprise determining a polarity of the digital sampling signal, and detecting a digital sampling signal varying in polarity thereof every four times the sampling period to output the same as a 4T sampling signal.

Alternatively, the operation (b) may comprise (b1) outputting a predetermined variable frequency oscillator (VFO) detecting signal if a VFO part of the optical disc is reproduced, and (b2) outputting the digital sampling signal detected during inputting the VFO detecting signal, as a 4T sampling signal.

In this case the operation (b1) may comprise detecting a header_peak signal reproduced from the optical disc, detecting a header_bottom signal reproduced from the optical disc, outputting a control pulse in a predetermined magnitude during detecting at least one of the header_peak signal and the header_bottom signal, counting an elapsed time from a point when the control pulse is outputted, and outputting the VFO detecting signal for a predetermined time if the counted time exceeds a predetermined setting time.

The asymmetric error correction method may further comprise stopping any one of a phase locked looping (PLL), an equalizing, and a decoding for the digital sampling signal, during the operations (a) to (e).

In accordance with yet another aspect of the present invention, there is provided an optical disc reproducing device comprising: an analog-to-digital (A/D) converter sampling analog RF signals reproduced from an optical disc to convert the same into digital sampling signals, and outputting the same; an asymmetric error corrector for operating an asymmetric error value using a 4T sampling signal varying in polarity thereof every four times a sampling period if the digital sampling signal is the 4T sampling signal, cumulatively counting the same, and correcting an output signal level of the A/D converter based on the counted value; a phase locked loop (PLL) part for correcting a frequency error and a phase error of the digital sampling signal; an equalizer for removing an interference between the digital sampling signals; and a decoder for receiving and decoding the digital sampling signals to output the same.

The asymmetric error corrector may include a signal detector for detecting 4T sampling signals among the digital sampling signals outputted from the A/D converter, an operator adding a signal among the 4T sampling signals to operate an asymmetric error value, a counter cumulatively counting the asymmetric error value operated in the operator; and a corrector correcting a signal level of the digital sampling signal outputted from the A/D converter if the counted value counted by the counter is out of a predetermined critical range.

The asymmetric error corrector may further comprise an error magnitude modifier multiplying the asymmetric error value operated in the operator by a correcting coefficient to modify a magnitude of the asymmetric error value. In this case, the counter cumulatively counts the asymmetric error value modified by the error magnitude modifier.

The corrector may adjust a magnitude of signal level of the digital sampling signal outputted from the A/D converter by the asymmetric error value accumulated by the counter if the asymmetric error value accumulated by the counter is out of the critical range.

The operator may add first, fourth, fifth and eighth signals among the 4T sampling signals to operate the asymmetric error value.

The signal detector may include a signal polarity determining part for determining a polarity of the digital sampling signal outputted from the A/D converter, and a sampling signal output part detecting a digital sampling signal varying in polarity thereof every four times the sampling period, and outputting the same as a 4T sampling signal.

The signal detector may include a variable frequency oscillator (VFO) detecting part outputting a VFO detecting signal if a VFO signal is reproduced from the optical disc, and a VFO sampling signal output part outputting the digital sampling signal outputted from the A/D converter as 4T signal during inputting the VFO detecting signal.

The signal detector may further include a timer part counting an elapsed time from a point when header information of the optical disc is reproduced. In this case, the VFO detecting part may output the VFO detecting signal for a predetermined time if the time counted by the timer part exceeds a predetermined setting time.

The optical disc reproducing device may further comprise a controller stopping at least one of the PLL part, the equalizer, and the decoder during the asymmetric error correcting by the asymmetric error corrector.

The controller may set an operation mode of the asymmetric error corrector to one of an active mode and a sleep mode based on an external selecting signal.

BRIEF DESCRIPTION OF THE DRAWINGS

The above and/or other aspects of the present invention will be more apparent by describing exemplary embodiments with reference to the accompanying drawings, in which.

DETAILED DESCRIPTION OF EXEMPLARY EMBODIMENTS

Hereinafter, exemplary embodiments of the invention will be described in detail with reference to the accompanying drawings.

Figure 1:
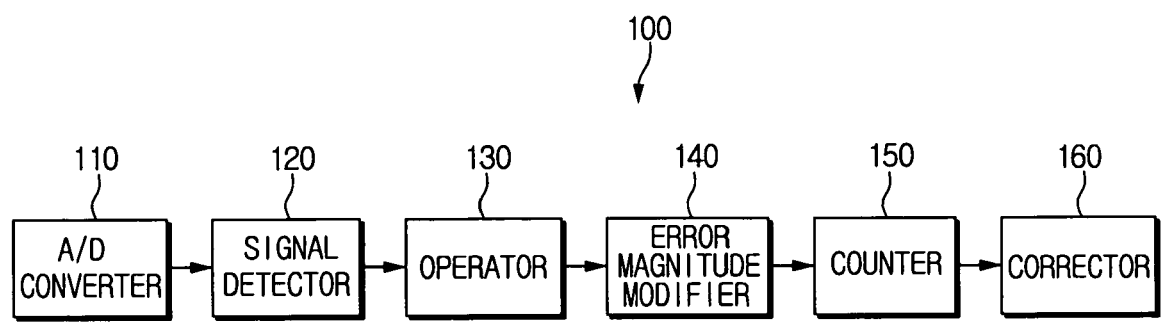
FIG. 1 is a block diagram illustrating a construction of an asymmetric error correction device according to an exemplary embodiment of the invention.

FIG. 1 is a block diagram illustrating a construction of an asymmetric error correction device according to an exemplary embodiment of the invention. Referring to FIG. 1, the asymmetric error correction device includes an A/D converter 110, a signal detector 120, an operator 130, an error magnitude modifier 140, a counter 150, and a corrector 160.

The A/D converter 110 serves to sample analog RF signals reproduced from an optical disc to convert the same into digital sampling signals, and to output the same.

The signal detector 120 detects a 4T sampling signal, for example, from the digital sampling signals output from the A/D converter 110. The 4T sampling signal means a digital sampling signal in an interval sampled four times every half period of the analog RF signal. That is, if a sampling period of the A/D converter 110 is T, a digital sampling signal varying in polarity thereof every 4T period becomes the 4T sampling signal.

The operator 130 operates or provides an asymmetric error value by adding a signal among the 4T sampling signals. Because of 4T sampling signal, eight digital sampling signals are detected in total every one period of the analog RF signal. Among them, first, fourth, fifth, and eighth digital sampling signals are added to operate an asymmetric error value. If a symmetric error does not occur, the asymmetric error value is provided as 0. However, if a symmetric error occurs, the asymmetric error value is not provided as 0, but a certain value. Instead of first, fourth, fifth and eighth digital sampling signals, all eight digital sampling signals may be added to provide an asymmetric error value. However, in this case, there is a problem in that more adders (not shown) should be used. Further, two digital sampling signals horizontally symmetric with reference to a point where a magnitude of analog RF signal is 0 may be added to provide an asymmetric error value. However, in this case, there can be a problem in that the asymmetric error value may not be precisely calculated.

The error magnitude modifier 140 multiplies the asymmetric error value provided in the operator 130 by a predetermined magnitude of a correcting coefficient, to modify the asymmetric error value. The amplitude of the correcting coefficient to be added is predetermined. That is, if the correcting coefficient is set to "1", the asymmetric error value provided in the operator 130 is exactly transmitted to the counter 150. On the contrary, if the correcting coefficient is set to "0.5", the magnitude of the asymmetric error value provided in the operator 130 is reduced to a half magnitude and transmitted to the counter 150. The magnitude of the correcting coefficient can be arbitrarily preset by manufacturer or user depending on the use of the optical disc reproducing device.

The counter 150 cumulatively counts or accumulates the asymmetric error value output from the error magnitude modifier 140.

The corrector 160 adjusts a signal level of the digital sampling signal outputted from the A/D converter 110 by the asymmetric error value if it is determined that the asymmetric error value counted by the counter 150 is out of a predetermined critical range. The asymmetric error is thus corrected. If the asymmetric error correction has been performed, the corrector 160 may refresh the asymmetric error value counted in the counter 150.

Figure 2:
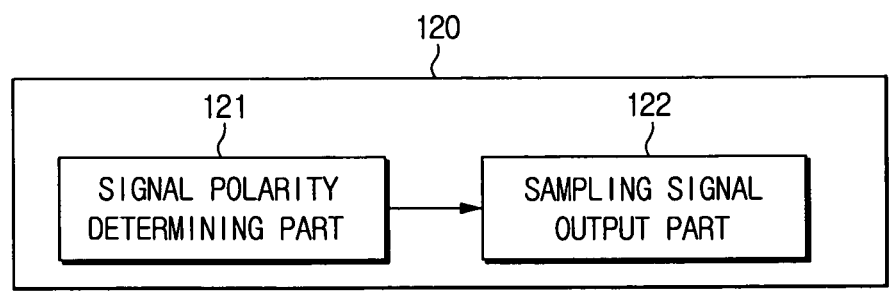
FIG. 2 is a block diagram illustrating an exemplary construction of a signal detector used in the asymmetric error correction device of FIG. 1.

FIG. 2 is a block diagram illustrating an exemplary construction of the signal detector 120. Referring to FIG. 2, the signal detector 120 includes a signal polarity determining part 121 and a sampling signal output part 122. The signal polarity determining part 121 serves to determine a polarity of each digital sampling signal output from the A/D converter 110. Meanwhile, if it is determined that the polarity of the digital sampling signal is varied every 4T period, the sampling signal output part 122 outputs 4T sampling signal.

Figure 3:
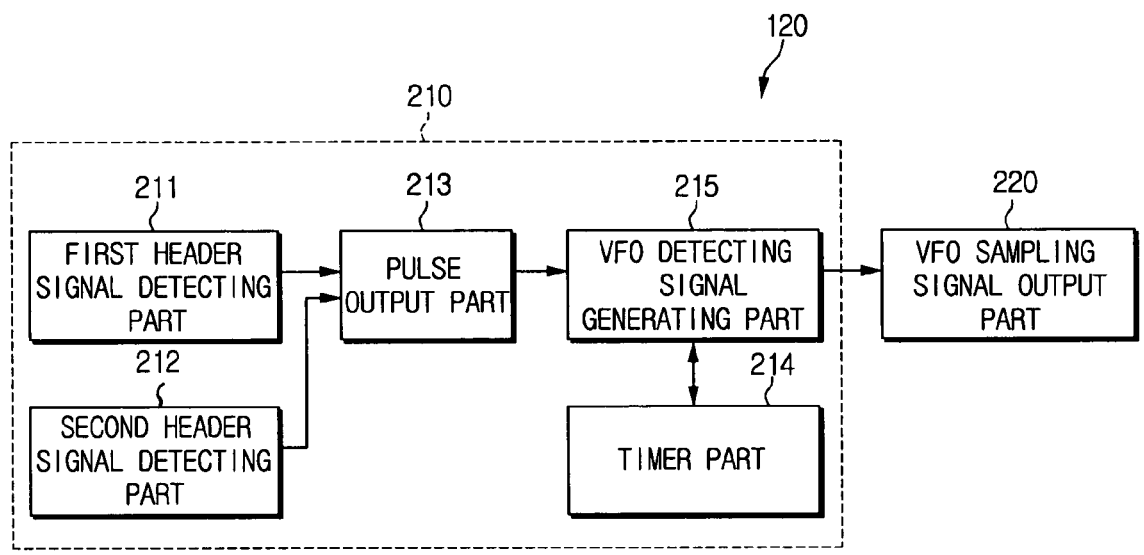
FIG. 3 is a block diagram illustrating another exemplary construction of a signal detector used in the asymmetric error correction device of FIG. 1.

FIG. 3 is a block diagram illustrating another exemplary construction of the signal detector 120. Referring to FIG. 3, the signal detector 120 includes a variable frequency oscillator (VFO) detecting part 210 and a VFO sampling signal output part 220.

The VFO detecting part 210 serves to output a VFO detecting signal during reproduction of a VFO part of the optical disc. The VFO part is an area storing VFO signal data among the sectors on the optical disc. The VFO signal is a signal for determining a land area and a groove area of the optical disc. That is, the negative VFO signal is determined to be the land area L, and the positive VFO signal is determined to be the groove area. Further, the VFO signal is a reference signal to generate a synchronizing signal accurately. The VFO signal varies in its polarity every 4T period.

The VFO part is positioned in a header field and a user data field on the optical disc such as DVD-RAM. The header field is in turn divided into a header_peak region and a header_bottom region. The header_peak region and the header_bottom region are for identifying whether the next track in the optical disc reproducing system is a land area or a groove area. That is, in a case where the next track is the land area, the header_peak region is made, and in a case where the next track is the groove area, the header_bottom signal is made. The VFO part is positioned at the front of the header_peak region, the header_bottom region, and the user data field.

Referring to FIG. 3, the VFO detecting part 210 includes a first header signal detecting part 211, a second header signal detecting part 212, a pulse output part 213, a timer part 214, and a VFO detecting signal generating part 215.

First and second header signal detecting parts 211 and 212 serve to detect a header_peak signal and a header_bottom signal reproduced from the header_peak region and the header_bottom region, respectively.

The pulse output part 213 outputs a certain magnitude of a control pulse if at least one of the header_peak signal and the header_bottom signal is detected from at least one of first and second header signal detecting parts 211 and 212.

The timer part 214 starts to count if the control pulse is input from the pulse output part 213. The timer part 214 thus counts a time elapsed from a point when one of the header_peak signal and the header_bottom signal is detected.

The VFO detecting signal generating part 215 outputs a VFO detecting signal for a predetermined time if the time counted by the counter 214 exceeds a predetermined first time. If a previous counting and presetting of a second time and a third time correspond to the VFO part on the header_bottom region and the VFO part on the user data field, respectively, a VFO detecting signal can be output corresponding to the respective VFO part reproducing points.

The VFO sampling signal output part 220 outputs the digital sampling signal output from the A/D converter 110 as a 4T sampling signal when inputting the VFO detecting signal from the VFO detecting part 210.

Figure 4:
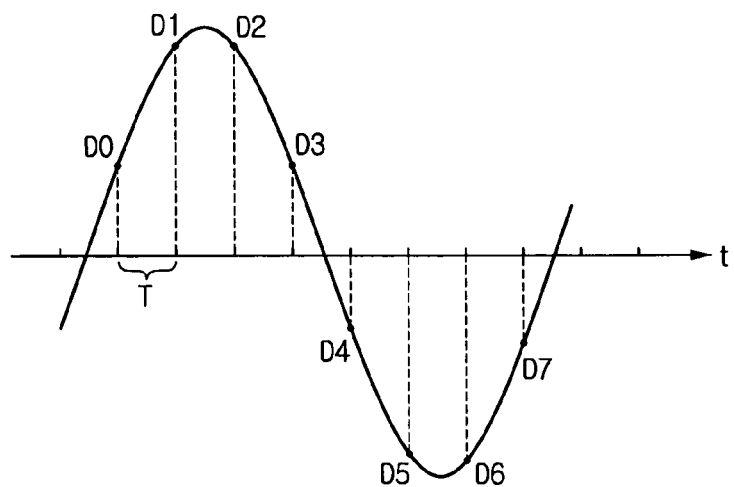
FIG. 4 is a diagram explaining a procedure of operating an asymmetric error value using a 4T sampling signal.

FIG. 4 is a diagram illustrating a 4T sampling signal. Referring to FIG. 4, the sampling is performed a total of eight times a period of an analog RF signal. The sampling period is set to T. Accordingly, eight total digital sampling signals, such as D0 to D7, are detected from the A/D converter 110. The operator 130 adds D0, D3, D4, and D7. The added value becomes an asymmetric error value. In this case, as described previously, according to exemplary embodiments, D0 to D7 all may be added, or two values, such as D3 and D4, horizontally symmetric with reference to a point 0 may be added to provide an asymmetric error value.

Figure 5:
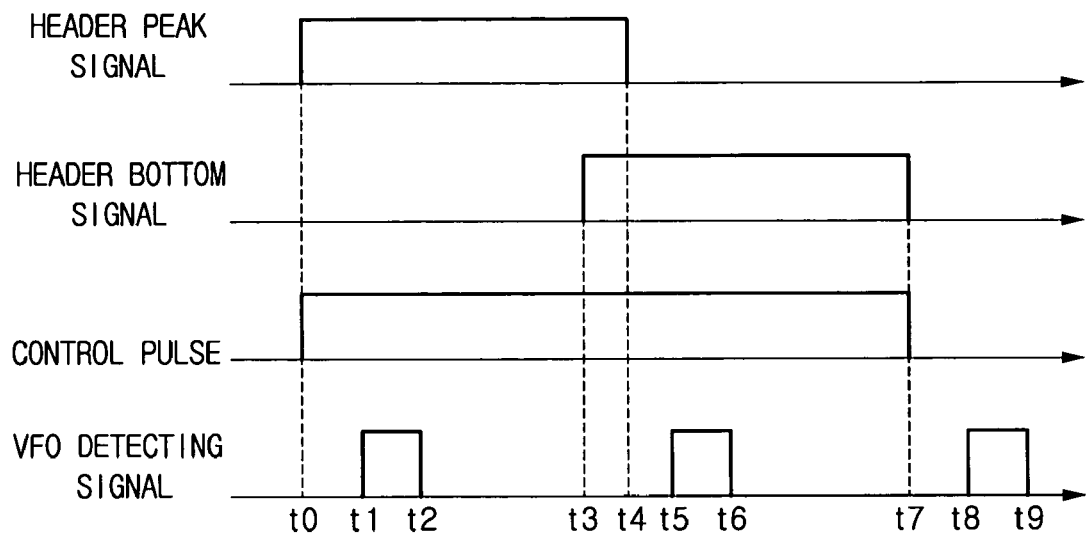
FIG. 5 is a diagram of a signal waveform explaining an internal operation of the signal detector of FIG. 3.

FIG. 5 is a diagram illustrating a signal waveform used in the signal detector 210 of FIG. 3. Referring to FIG. 5, the header_peak signal is detected during t0 to t4, and the header_bottom signal is detected during t3 to t7. The pulse output part 213 thus outputs the control pulse for t0 to t7.

The VFO detecting signal generating part 215 outputs a VFO detecting signal if a time is elapsed from t0 when the control pulse is inputted, thereby reaching t1. The magnitude of t1 is set in consideration of a time for data reproducing and transferring, and a time converted in the A/D converter 110. That is, the output point of the VFO detecting signal is delayed by t1 to t0 to thus accurately render the detected 4T sampling signal.

Since the 4T sampling signal is not detected after the VFO part has been reproduced, the asymmetric error may be corrected using a conventional digital sum value (DSV) algorithm. To this end, the VFO detecting signal generating part 215 outputs the VFO signal only for t2 to t1 corresponding to a length of the VFO part. As a result, the asymmetric error correction is performed such that the asymmetric error value is provided only when outputting the VFO detecting signal and is cumulatively counted, and the signal level is corrected using the counted value.

Since the VFO part is in the header_bottom region, if it reaches t5 corresponding to the header_bottom region, the VFO detecting signal is output for t5 to t6. That is, the VFO detecting signal generating part 215 outputs again the VFO detecting signal if the time counted from t0 by the counter 214 reaches t5, and stops outputting the VFO detecting signal if the counted time reaches t6.

Since the VFO part is in the user data field, if t0 to t8 has elapsed, the VFO detecting signal is output again. Further, if t0 to t9 has elapsed, the VFO detecting signal is output again.

Figure 6:
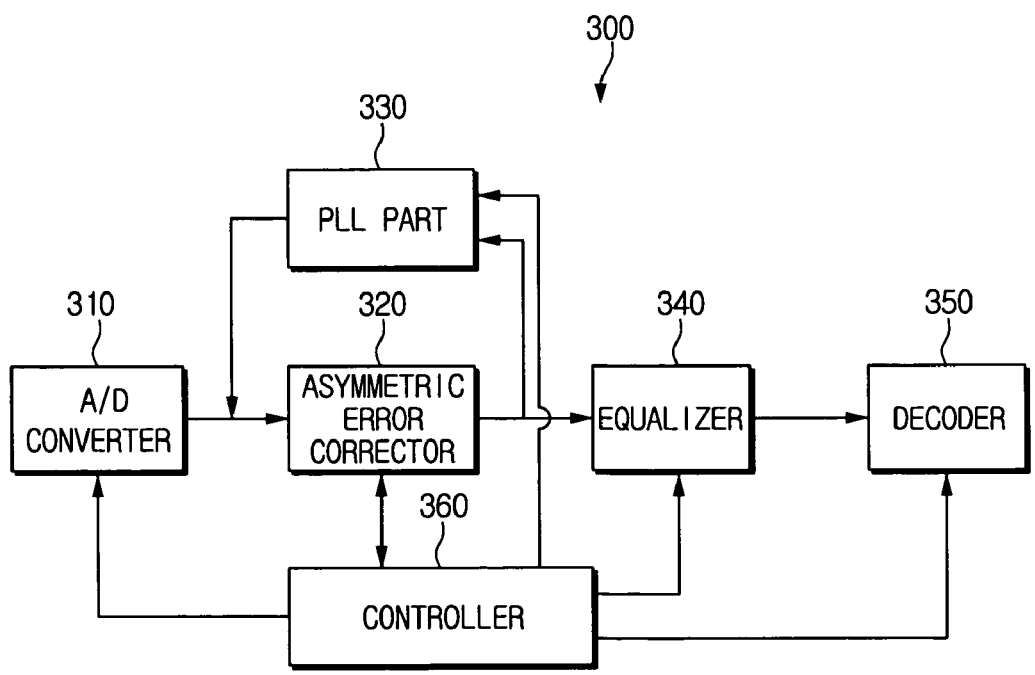
FIG. 6 is a block diagram illustrating a construction of an optical disc reproducing device according to an exemplary embodiment of the invention.

FIG. 6 is a block diagram illustrating a construction of an optical disc reproducing device according to an exemplary embodiment of the invention. Referring to FIG. 6, the optical disc reproducing device 300 includes an A/D converter 310, an asymmetric error corrector 320, a PLL part 330, an equalizer 340, a decoder 350, and a controller 360.

The A/D converter 310 and the asymmetric error corrector 320 correspond to the asymmetric error correction device 100 of FIG. 1.

That is, the A/D converter 310 converts an analog RF signal reproduced from the optical disc into a digital sampling signal, and the asymmetric error corrector 320 serves to correct an asymmetric error of the digital sampling signal output from the A/D converter 310.

The PLL part 330 serves to correct a frequency error and a phase error of the digital sampling signal. The equalizer 340 implements an equalization removing an interference between the digital sampling signals whose asymmetric error is corrected by the asymmetric error corrector 320. The decoder 350 serves to decode the digital sampling signal whose asymmetric error is corrected by the asymmetric error corrector 320. The construction and the operation of the PLL part 330, the equalizer 340, and the decoder 350 are known in various fields of technology, so the detailed description will be omitted.

The controller 360 serves to control the respective operations of the A/D converter 310, the asymmetric error corrector 320, the PLL part 330, the equalizer 340, and the decoder 350.

Figure 7:
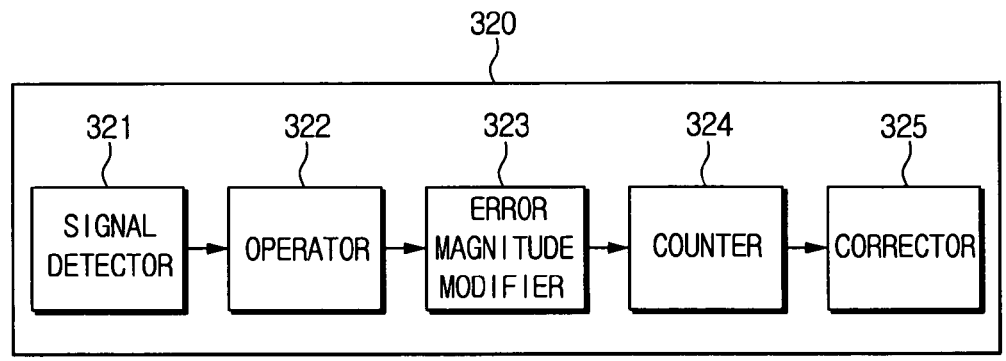
FIG. 7 is a block diagram illustrating a construction of an asymmetric error corrector used in the optical disc reproducing device of FIG. 6.

FIG. 7 is a block diagram illustrating a construction of the asymmetric error corrector 320. Referring to FIG. 7, the asymmetric error corrector 320 includes a signal detector 321, an operator 322, an error magnitude modifier 323, a counter 324, and a corrector 325.

The signal detector 321 serves to detect a 4T sampling signal among the digital sampling signals output from the A/D converter 310. The operator 322 adds a signal among the detected 4T sampling signals to provide an asymmetric error value. The error magnitude modifier 323 multiplies the asymmetric error value by a certain magnitude of a correcting coefficient provided in consideration of a resolution of the counter 324 to modify the magnitude of the asymmetric error value. The counter 324 cumulatively counts or accumulates the modified asymmetric error value. The corrector 325 adjusts an output level of the A/D converter 310 based on the asymmetric error value if the asymmetric error value provided by the counter 324 is out of a predetermined critical range. The operations of the respective elements in the asymmetric error corrector 320 are similar to those of the elements of the asymmetric error correction device of FIG. 1, so the detailed description thereof will be omitted. The construction of the signal detector 321 used in the asymmetric error corrector 320 may be similar to those of FIGS. 3 and 4.

As described before, the asymmetric error corrector 320 corrects an asymmetric error using the 4T sampling signal. Therefore, in a part in which the 4T sampling signal is not detected, the asymmetric error may be corrected using the conventional DSV algorithm.

The controller 360 can stop at least one operation of the PLL part 330, the equalizer 340, and the decoder 350 if the signal detector 310 detects the 4T sampling signal. Particularly, in a case where the signal detector 310 has the construction of FIG. 3, the controller 360 stops at least one operation of the PLL part 330, the equalizer 340 and the decoder 350 during outputting the VFO detecting signal. Therefore, an operation of the whole system can be stabilized.

In the case of performing a track jump and the like, the header_peak signal and the header_bottom signal are often detected incorrectly. If the signal detector 321 detects the 4T sampling signal even in this case, it is possible for the whole system to malfunction. Therefore, the controller 360 may control turning on/off of the asymmetric error corrector 320 itself depending on a user's selection. That is, if the user sets an operation mode of the asymmetric error corrector 320 to an active mode, the asymmetric error correcting is performed as described above. On the contrary, if set to a sleep mode, the asymmetric error correcting as described above may not be performed.

Figure 8:
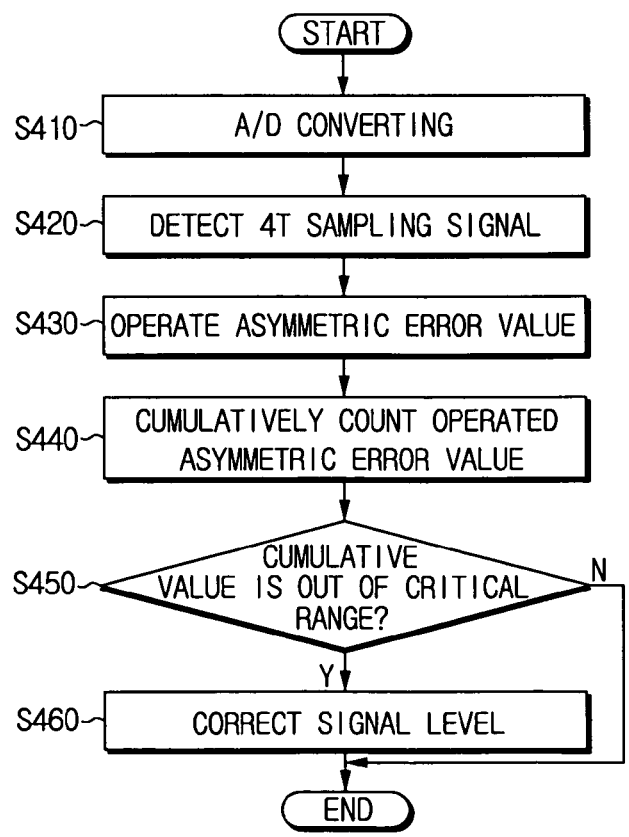
FIG. 8 is a flow chart explaining an asymmetric error correction method according to an exemplary embodiment of the invention.

FIG. 8 is a flow chart explaining an asymmetric error correction method according to an exemplary embodiment of the invention. Referring to FIG. 8, the analog RF signal reproduced from the optical disc is sampled and converted into the digital sampling signal (S410).

In this case, if a 4T sampling signal varying in its polarity every four times the sampling period is detected among the converted digital sampling signals (S420), a certain signal among the detected signals is selected and added to provide an asymmetric error value (S430).

Next, the asymmetric error value is cumulatively counted (S440) to thus check whether the counted value is out of a predetermined critical range (S450). In this case, the critical range may be set to ±α referring to 0. Then, if the asymmetric error value is over +α, or below −α, it is determined that the asymmetric error is generated.

Then, if it is determined that the asymmetric error is generated, the counted asymmetric error value is added to the output signal level of the A/D converter 110 to adjust the output signal level (S460).

Figure 9:
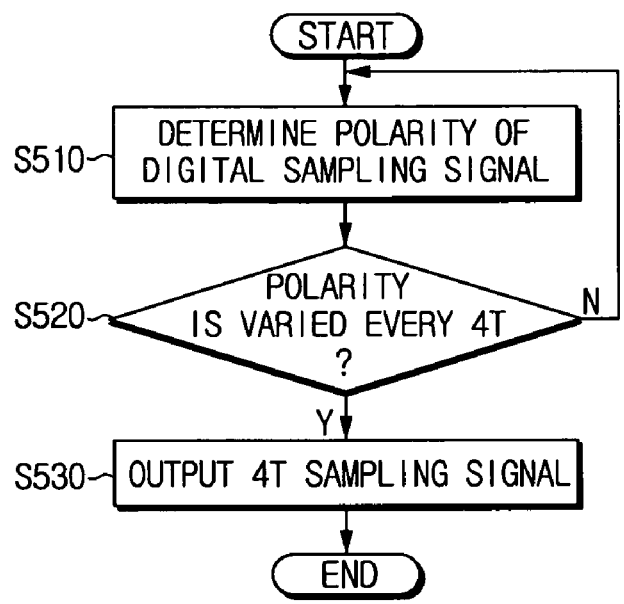
FIG. 9 is a flow chart explaining an exemplary process of detecting a 4T sampling signal in the asymmetric error correction method of FIG. 8.

FIG. 9 is a flow chart illustrating an exemplary process of detecting a 4T sampling signal. Referring to FIG. 9, a polarity of each digital sampling signal is checked (S510). Then, if the polarity is varied every 4T sampling period (S520), the digital sampling signal at that time is output as a 4T sampling signal (S530). In this case, despite the burden of checking a polarity every time, there is an advantage in that the 4T signal reproduced in the part other than the VFO part can be detected.

Figure 10:
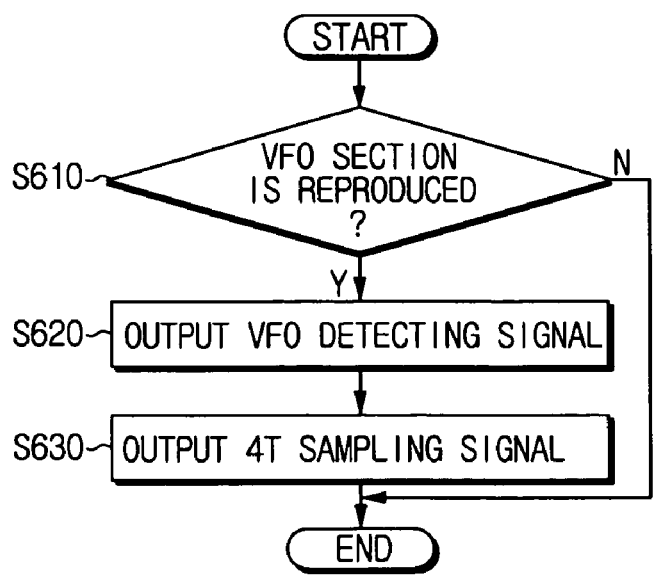
FIG. 10 is a flow chart explaining another exemplary process of detecting a 4T sampling signal in the asymmetric error correction method of FIG. 8.

FIG. 10 is a flow chart illustrating another exemplary process of detecting a 4T sampling signal. Referring to FIG. 10, it is checked whether the VFO part is reproduced (S610). Then, if determined that the VFO part is reproduced, the VFO detecting signal is outputted (S620). Then, the digital sampling signal detected during inputting the VFO detecting signal is outputted as a 4T sampling signal corresponding to the VFO part (S630).

Figure 11:
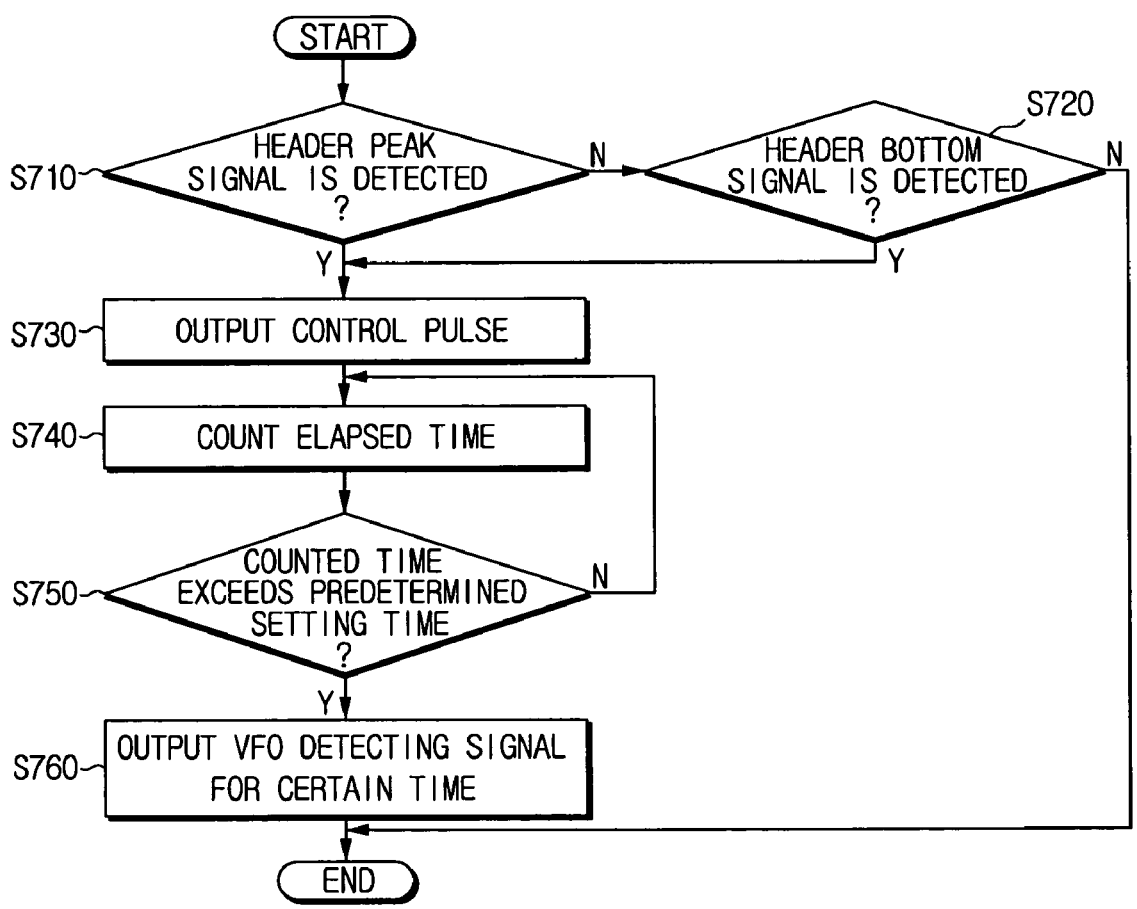
FIG. 11 is a flow chart specifically explaining the 4T sampling signal detecting process of FIG. 10.

FIG. 11 is a flow chart explaining a process for determining whether the VFO part is reproduced in the flow chart of FIG. 10. Referring to FIG. 11, first, it is determined whether the header_peak signal is detected (S710). If the header_peak signal is not detected, it is determined whether the header_bottom signal is detected (S720).

Then, if at least one of the header_peak signal and the header_bottom signal is detected, a control pulse, i.e., a certain magnitude of high level pulse is output (S730). In order to eliminate an effect caused by a glitch generated upon first detecting the header_peak signal and the Header_bottom signal, the high level pulse is used.

Then, the time elapsed from a point when the control pulse is outputted is counted (S740). If the counted time exceeds a predetermined setting time (S750), the VFO detecting signal is output for a predetermined time (S760). Then, the asymmetric error value is provided using the 4T sampling signal and cumulatively counted.

Figure 12:
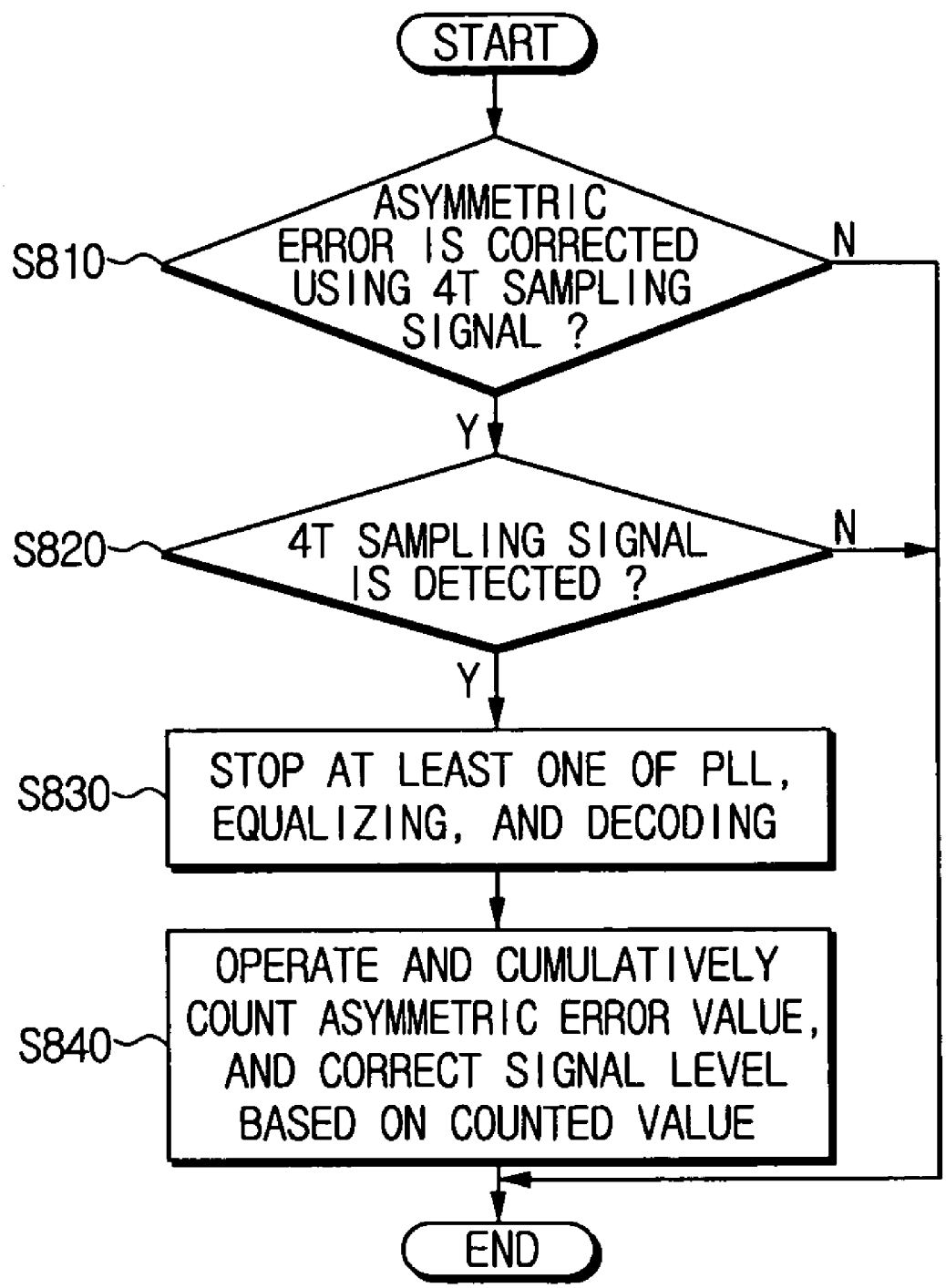
FIG. 12 is a flow chart explaining an optical disc reproducing method according to an exemplary embodiment of the invention.

FIG. 12 is a flow chart explaining an optical disc reproducing method according to an exemplary embodiment of the invention. Referring to FIG. 12, if a mode correcting an asymmetric error using a 4T sampling signal is set (S810), it is determined whether the 4T sampling signal is detected (S820). Then, if the 4T sampling signal is detected, at least one of PLL, equalizing, and decoding is stopped (S830), and the above asymmetric error correcting is performed (S840). That is, the asymmetric error value is provided and cumulatively counted, and if the counted value is out of the critical range, the output signal level is controlled using the same.

As described before, according to the present invention, an asymmetric error can be precisely corrected even in a VFO part in which a 4T sampling signal is detected. Further, asymmetric error correction using the 4T sampling signal can be selectively used, a malfunction of the system is prevented and the system is stabilized. An asymmetric error correction device and method according to the present invention can be adapted particularly to a VFO part of DVD-RAM.

The foregoing embodiments and aspects are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An asymmetric error correction device comprising:
an analog-to-digital (A/D) converter which samples analog radio frequency signals reproduced from an optical disc, converts the radio frequency signals into the digital sampling signals, and outputs the digital sampling signals;
a signal detector which detects digital sampling signals which vary in polarity after a predetermined number of sampling periods;
an operator which selects and adds signals among the digital sampling signals which are detected to provide an asymmetric error value;
an error magnitude modifier which multiplies the asymmetric error value by a correcting coefficient to modify a magnitude of the asymmetric error value;
a counter which counts the asymmetric error value modified by the error magnitude modifier; and
a corrector which corrects a signal level of the digital sampling signals output from the A/D converter if the asymmetric error value counted by the counter is out of a predetermined range,
wherein the sampling signals vary in polarity every 4T period,
wherein the corrector adjusts a magnitude of a signal level of the digital sampling signals output from the A/D converter if the asymmetric error value counted by the counter is out of the range,
wherein the signal detector comprises:
a variable frequency oscillator (VFO) detecting part which outputs a VFO detecting signal if a VFO part of the optical disc is reproduced; and
a VFO sampling signal output part which outputs a digital sampling signal when the VFO detecting signal is output from the VFO detecting part, and
wherein the VFO detecting part comprises:
a first header signal detecting part which detects a header_peak signal reproduced from the optical disc;
a second header signal detecting part which detects a header_bottom signal reproduced from the optical disc;
a pulse output part which outputs a control pulse in a certain magnitude when at least one of the header_peak signal and the header_bottom signal is detected from the first header signal detecting part and the second header signal detecting part;
a timer part which counts an elapsed time from a point when the control pulse is output; and a VFO detecting signal output part which outputs a VFO detecting signal for a certain time if the elapsed time exceeds a predetermined setting time.

2. A method for correcting an asymmetric error of data reproduced from an optical disc, the method comprising:
sampling analog radio frequency signals reproduced from the optical disc with a predetermined sampling period, converting the radio frequency signals into digital sampling signals, and outputting the digital sampling signals;
detecting digital sampling signals which vary in polarity after a predetermined number of sampling periods;
adding signals among the digital sampling signals which are detected to provide an asymmetric error value;
multiplying the asymmetric error value by a predetermined correcting coefficient to modify a magnitude of the asymmetric error value;
counting the modified asymmetric error value; and
correcting a signal level of the digital sampling signals which are output if the counted value is out of a predetermined range,
wherein the sampling signals vary in polarity every 4T period,
wherein if the asymmetric error value which is modified is out of the range, the magnitude of the signal level is adjusted,
wherein the detecting digital sampling signals comprises:
outputting a predetermined variable frequency oscillator (VFO) detecting signal if a VFO part of the optical disc is reproduced, and
outputting the digital sampling signals which are detected if the VFO detecting signal is input to a sampling signal output part, and
wherein the outputting the predetermined VFO detecting signal comprises:
detecting a header_peak signal reproduced from the optical disc,
detecting a header_bottom signal reproduced from the optical disc,
outputting a control pulse in a predetermined magnitude during the detecting of at least one of the header_peak signal and the header_bottom signal,
counting an elapsed time from a point when the control pulse is output, and
outputting the VFO detecting signal for a predetermined time if the elapsed time exceeds a predetermined setting time.

3. The method as claimed in claim 2, further comprising stopping any one of a phase locked looping (PLL), an equalizing, and a decoding for the digital sampling signal.

4. An optical disc reproducing device comprising:
an analog-to-digital (A/D) converter which samples analog radio frequency signals reproduced from an optical disc to convert the radio frequency signals into digital sampling signals, and which outputs the digital sampling signals;
an asymmetric error corrector which provides an asymmetric error value using the digital sampling signals which vary in polarity after a predetermined number of sampling periods, counts the asymmetric error, and corrects an output signal level of the A/D converter based on the counted value;
a phase locked loop (PLL) part which corrects a frequency error and a phase error of the digital sampling signals;
an equalizer which removes an interference between the digital sampling signals;
a decoder which receives and decodes the digital sampling signals and outputs the digital sampling signals; and
a controller which stops at least one of the PLL part, the equalizer, and the decoder when the asymmetric error corrector corrects the output signal,
wherein the controller sets an operation mode of the asymmetric error corrector to one of an active mode and a sleep mode based on an external selecting signal.

5. The optical disc reproducing device as claimed in claim 4, wherein the asymmetric error corrector comprises:
a signal detector which detects 4T sampling signals among the digital sampling signals output from the A/D converter;
an operator which adds signals among the 4T sampling signals to provide an asymmetric error value;
a counter which counts the asymmetric error value provided by the operator; and
a corrector which corrects a signal level of the digital sampling signals output from the A/D converter if the asymmetric error value counted by the counter is out of a predetermined range.

6. The optical disc reproducing device as claimed in claim 5, wherein the asymmetric error corrector further comprises an error magnitude modifier which multiplies the asymmetric error value by a correcting coefficient to modify a magnitude of the asymmetric error value, wherein the counter counts the asymmetric error value which is modified by the error magnitude modifier.

7. The optical disc reproducing device as claimed in claim 6, wherein the corrector adjusts a magnitude of a signal level of the digital sampling signals output from the A/D converter if the asymmetric error value is out of the range.

8. The optical disc reproducing device as claimed in claim 7, wherein the operator adds first, fourth, fifth and eighth signals among the 4T sampling signals to provide the asymmetric error value.

9. The optical disc reproducing device as claimed in claim 8, wherein the signal detector comprises:
a signal polarity determining part which determines a polarity of the digital sampling signals output from the A/D converter; and
a sampling signal output part.

10. The optical disc reproducing device as claimed in claim 8, wherein the signal detector comprises:
a variable frequency oscillator (VFO) detecting part which outputs a VFO detecting signal if a VFO signal is reproduced from the optical disc; and
a VFO sampling signal output part.

11. The optical disc reproducing device as claimed in claim 10, wherein the signal detector further comprises a timer part which counts an elapsed time from a point when header information of the optical disc is reproduced, wherein the VFO detecting part outputs the VFO detecting signal for a predetermined time if the elapsed time exceeds a predetermined setting time.

12. The optical disc reproducing device as claimed in claim 4, wherein the sampling signal varies in polarity every 4T period.

* * * * *